United States Patent
Boyd et al.

(10) Patent No.: US 6,925,213 B2
(45) Date of Patent: Aug. 2, 2005

(54) MICROMACHINED FIBER OPTIC SENSORS

(75) Inventors: Joseph T. Boyd, Cincinnati, OH (US); Don C. Abeysinghe, Cincinnati, OH (US); Samhita Dasgupta, Niskayuna, NY (US); Howard E. Jackson, Cincinnati, OH (US)

(73) Assignee: University of Cincinnati, Cincinnati, OH (US)

( * ) Notice: Subject to any disclaimer, the term of this patent is extended or adjusted under 35 U.S.C. 154(b) by 355 days.

(21) Appl. No.: 10/095,200

(22) Filed: Mar. 11, 2002

(65) Prior Publication Data

US 2002/0159671 A1 Oct. 31, 2002

Related U.S. Application Data

(60) Provisional application No. 60/274,513, filed on Mar. 9, 2001.

(51) Int. Cl.[7] .................................................. G02B 6/26
(52) U.S. Cl. .......................................... 385/12; 385/15
(58) Field of Search ...................... 385/12, 15; 73/800, 73/705, 715; 356/33–35, 480

(56) References Cited

U.S. PATENT DOCUMENTS

| 5,392,117 | A  | * | 2/1995 | Belleville et al. ............ 356/480 |
| 6,513,390 | B1 | * | 2/2003 | De La Puente et al. ...... 73/800 |
| 6,567,173 | B1 | * | 5/2003 | Johannesen .................. 356/480 |
| 6,738,145 | B2 | * | 5/2004 | Sherrer et al. ............... 356/480 |

* cited by examiner

Primary Examiner—Frank G. Font
Assistant Examiner—Michael P. Mooney
(74) Attorney, Agent, or Firm—Frost Brown Todd LLC

(57) ABSTRACT

A novel fiber optic sensor configuration whose diameter is the same as that of the optical fiber on which it is directly fabricated is introduced. A simple MEMS-compatible fabrication process to accomplish micromachining on the fiber end face has been developed and is detailed. This sensor configuration significantly reduces the size of the sensor and makes the packaging simple and adhesive free. The micromachining process of the present invention also provides for the fabrication of arrays of sensors that would provide two dimensional maps with high spatial resolution of at least one of acoustical vibration, mechanical vibration, pressure, temperature, acceleration, electrostatic fields, magnetic fields or combinations thereof.

34 Claims, 7 Drawing Sheets

(a)   (b)

(a)          (b)

MICROMACHINED FIBER OPTIC SENSORS

This application claims the benefit of U.S. Provisional Patent Application Ser. No. 60/274,513, filed Mar. 9, 2001, which application is hereby incorporated by reference in its entirety.

BACKGROUND OF THE INVENTION

The present invention relates to micro-optic sensors used for transmitting pressure sensor signals by optical fibers. More particularly, the invention pertains to fiber optic sensors using silicon structures anodically bonded to the central portion of the fiber end face for detection of at least one of acoustical vibration, mechanical vibration, pressure, temperature, acceleration, electrostatic fields and magnetic fields. The micromachining process of the present invention also provides for the fabrication of arrays of sensors that would provide two dimensional maps with high spatial resolution of at least one of acoustical vibration, mechanical vibration, pressure, temperature, acceleration, an electrostatic field magnetic field or combinations thereof.

Optical fibers have been the medium of choice in the field of optical communications for long distance propagation of light due to their excellent transmission characteristics and ability to be fabricated in lengths of many kilometers. Light propagates through the core region of optical fibers and these core regions can be as small as a few microns in diameter. Generally, an optomechanical switch is optically connected to the light conducting fibers and enables different communication paths to be interconnected. For example, U.S. Pat. Nos. 5,479,541 and 4,204,744 discloses switches for optically connecting light conducting fibers.

Optical fibers, whether used in telecommunications or as environmental sensors, may include a cylindrical core, a concentric cylindrical cladding surrounding the core, and a concentric cylindrical protective jacket or buffer surrounding the cladding. The core is generally made of transparent glass or plastic having a certain index of refraction. The cladding is also made of transparent glass or plastic, but having a different, smaller, index of refraction. The ability of the optical fiber to act as a bendable waveguide is largely determined by the relative refractive indices of the core and the cladding.

STATEMENT OF THE INVENTION

This invention uses metal micro-electro-mechanical-systems (MEMS) and micro-optical-electro mechanical systems (MOEMS) including manufacturing components of micro-optic devices by photolithographic methods. In addition, a variety of substrates may be used, and the substrate material can be tailored to reduce costs and provide additional stability.

Optically interrogated pressure sensors have been demonstrated in various configurations using microelectromechanical systems (MEMS) technology [1–6]. In one embodiment, this technology is effective for pressure sensing because the small and precise sizes of sensing elements results in considerable flexibility in choosing pressure response ranges, bandwidth, and sensitivity. The use of MEMS technology is also advantageous because of the potential for economical manufacturing. Optical interrogation of these sensing elements presents an opportunity to extend use of these sensors to harsh environments in which electronics cannot operate. More specifically, optical interrogation is advantageous since it is superior to electrical interrogation in harsh environments, such as high temperature, vibration, EM interference, and dust. Traditional sensor configurations consist of a micromachined MEMS sensor structure and an appropriately aligned and fixed optical fiber for optical interrogation (FIG. 1(a)). Packaging of these sensors usually involves using adhesives that may limit the temperature of operation of the sensors.

The present invention is a novel MEMS sensors fabricated directly on an optical fiber end face. This configuration eliminates the need for adhesives in packaging and as a result, the temperature of operation of the sensor will be approximately that of the optical fiber. A unique feature of this proposed sensor is that processing is done on a commercial optical fiber as opposed to a wafer. The sensor configuration involves anodic bonding of a piece of an extremely thin silicon wafer onto the fiber end face. In one embodiment, the thin silicon is bonded over a cavity etched in the central portion of the fiber end face (FIG. 1(b)). The final device diameter is thus generally approximately the same or smaller than that of the optical fiber.

Due to their small size and the optical interrogation method, multiplexed arrays of such sensors can provide sensor maps with high spatial resolution.

The present invention provides for the fabrication of a novel optically-interrogated, microelectromechanical system (MEMS) sensors in which the entire MEMS structure is fabricated directly on an optical fiber. A new micromachining process for use on a flat fiber end face that includes photolithographic patterning, wet etching of a cavity, and anodic bonding of a silicon diaphragm is utilized. Generally, the sensor is made using multimode optical fibers having a diameter from about 10 $\mu$m to about 1000 $\mu$m, preferably from about 200 $\mu$m to about 400 $\mu$m. In a configuration as a pressure sensor fabricated on an optical fiber, it has been tested displaying an approximately linear response to static pressure (0–80 psi). This sensor is expected to find application in situations where small size is advantageous and where dense arrays may be useful.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents, and other references mentioned herein are incorporated by reference in their entirety. In the case of conflict, the present specification, including definitions, will control. In addition, the materials, methods, and examples are illustrative only and not intended to be limiting.

Other features and advantages of the invention will be apparent from the following detailed description and claims.

BRIEF DESCRIPTION OF THE FIGURES

FIG. 1(a) shows the usual configuration, which consists of a glass plate with a shallow cylindrical cavity etched into one surface with the cavity covered by a thin silicon diaphragm that has been anodically bonded to the patterned glass wafer [1]. FIG. 1(b) shows the configuration where the cavity is formed on the end of the optical fiber and a silicon diaphragm is bonded anodically.

DETAILED DESCRIPTION

A fiber optic sensor is provided which is useful for detecting impact, pressure or other forces. The sensor 1 is used in a sensing system 100 comprises an optical fiber 10 having one end connected to a light source 20, with the other end being connected to a sensor 1. In the fiber optic, there is located a sensing portion fiber which is preferably located in the frame of the window so as to modulate light traveling in an optical path in the fiber optic in response to detection of detecting impact, pressure or other forces.

Figure 1:
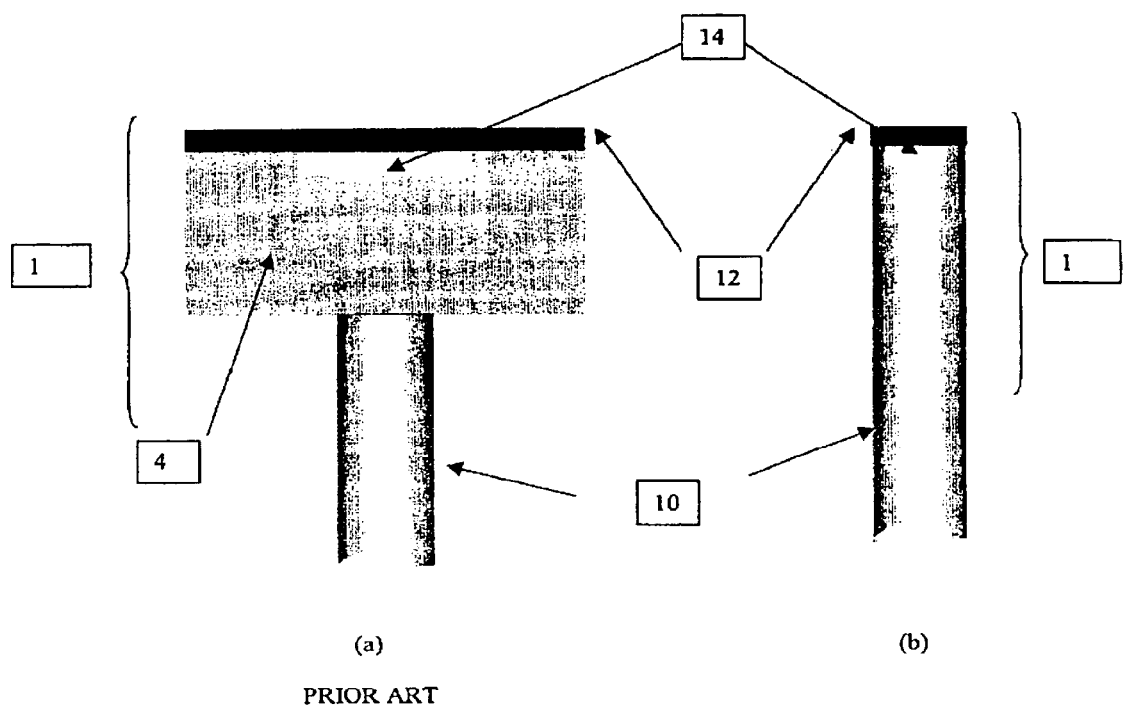
FIG. 1 is an illustration of two configurations of fiber optically interrogated MEMS pressure sensors based on Fabry-Perot interferometry.

The present invention relates to a micro-optic sensor used for transmitting pressure signals by optical fibers. In one embodiment, as shown in FIG. 1, the invention pertains to a fiber optic pressure sensor 1 using silicon structures 12 anodically bonded over a cavity 14 etched into the central portion of the fiber end face The invention further provides methods for producing such pressure sensors and pressure sensor arrays made from such fiber optic devices.

FIG. 1(a) shows the glass block configuration, which consists of a glass plate 4 with a shallow cylindrical cavity 14 etched into one surface with the cavity 14 covered by a thin silicon diaphragm 12 that has been anodically bonded to the patterned glass wafer 4. FIG. 1(b) shows the configuration of the present invention where the cavity 14 is formed on the end of the optical fiber 10 and a silicon diaphragm 12 is bonded anodically to the fiber 10 forming the sensor 1.

The optical path in the sensor fiber is modulated by external disturbances, such as impact, vibrations, magnetic fields, electrostatic fields, acoustical vibrations, electrostatic fields, temperature and/or pressure variations. Any external disturbance of the sensor fiber causes a change in the light pattern on the distal face of the fiber. Detection of this change in light is performed by a detection system 100, using a photodetector. The photodetector 22 will detect the modulation in light intensity as the sensor 1 changes on the distal face of the fiber 10. The signal from the photodetector 22 can be amplified or frequency filtered to optimize its output. The wavelength used for the device may vary from visible to 2200 nm (long wavelengths work best). In one embodiment, the light source can be a laser or LED (light emitting diode). The light source can be coupled directly into the sensor fiber.

Figure 2:
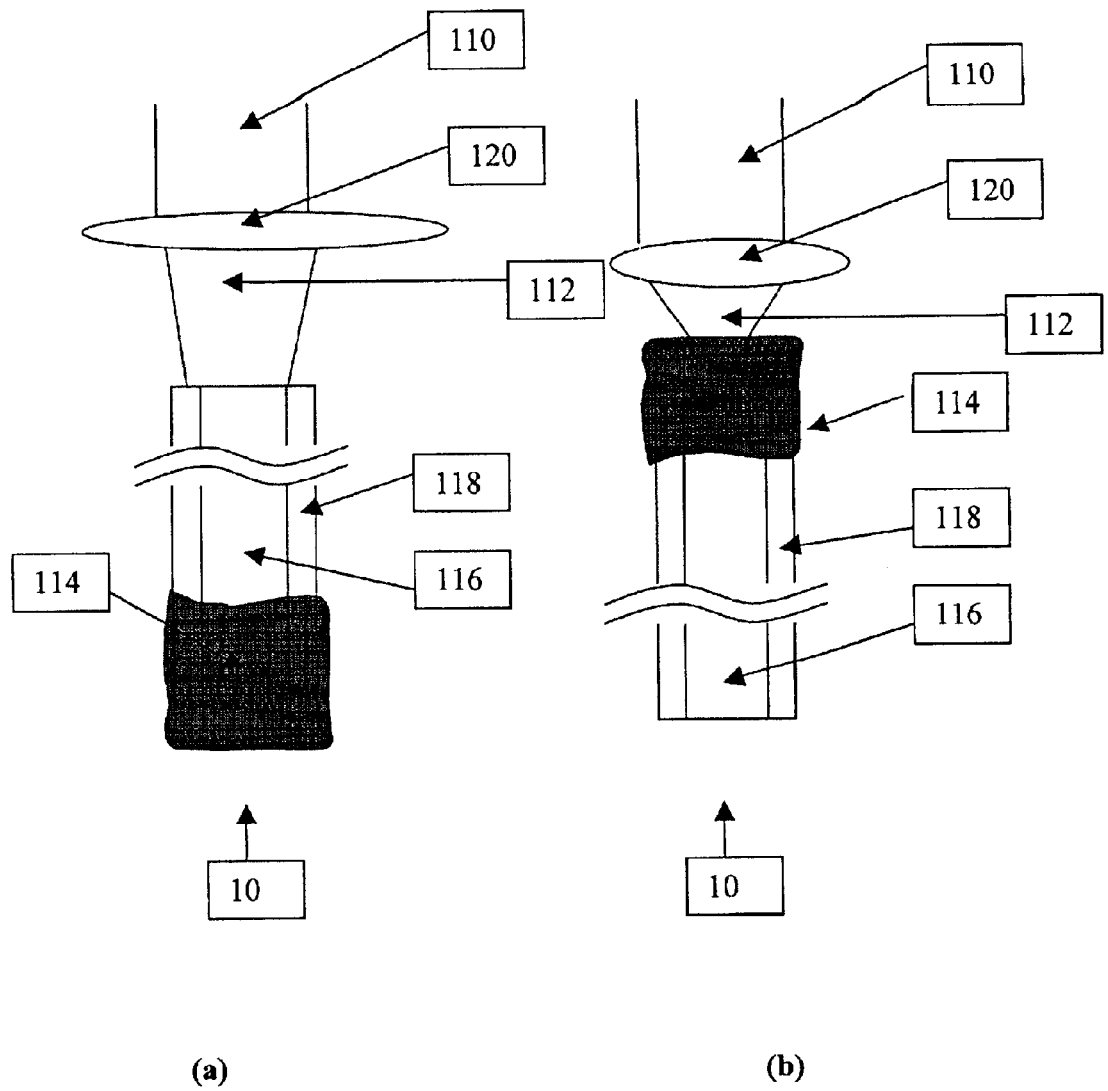
FIG. 2 shows schematics of two photoresist exposure techniques. The first technique (FIG. 2(a)) involves coupling of blue laser light ($\lambda$=457.9 nm) into the opposite fiber end using a low magnification microscope objective (5×) so that the focused laser beam diameter is comparable to the core diameter. The second technique (FIG. 2(b)) simply directs laser light onto the photoresist-coated fiber end face using a high magnification objective (50×). In this case, the fiber is positioned away from the beam focal point by an amount that corresponds to the required beam diameter.

As depicted in FIG. 2, in one embodiment, the optical fiber 10 includes a glass fiber core 116 combined with a glass cladding 118 that has a lower refractive index. The combination of the glass fiber core 116 and the glass cladding 118 form an optical waveguide. The glass fiber care and the glass cladding are combined to form a single mechanical entity. The optical fiber 10 may include other suitable configurations without departing from the scope of the present invention.

Figure 6:
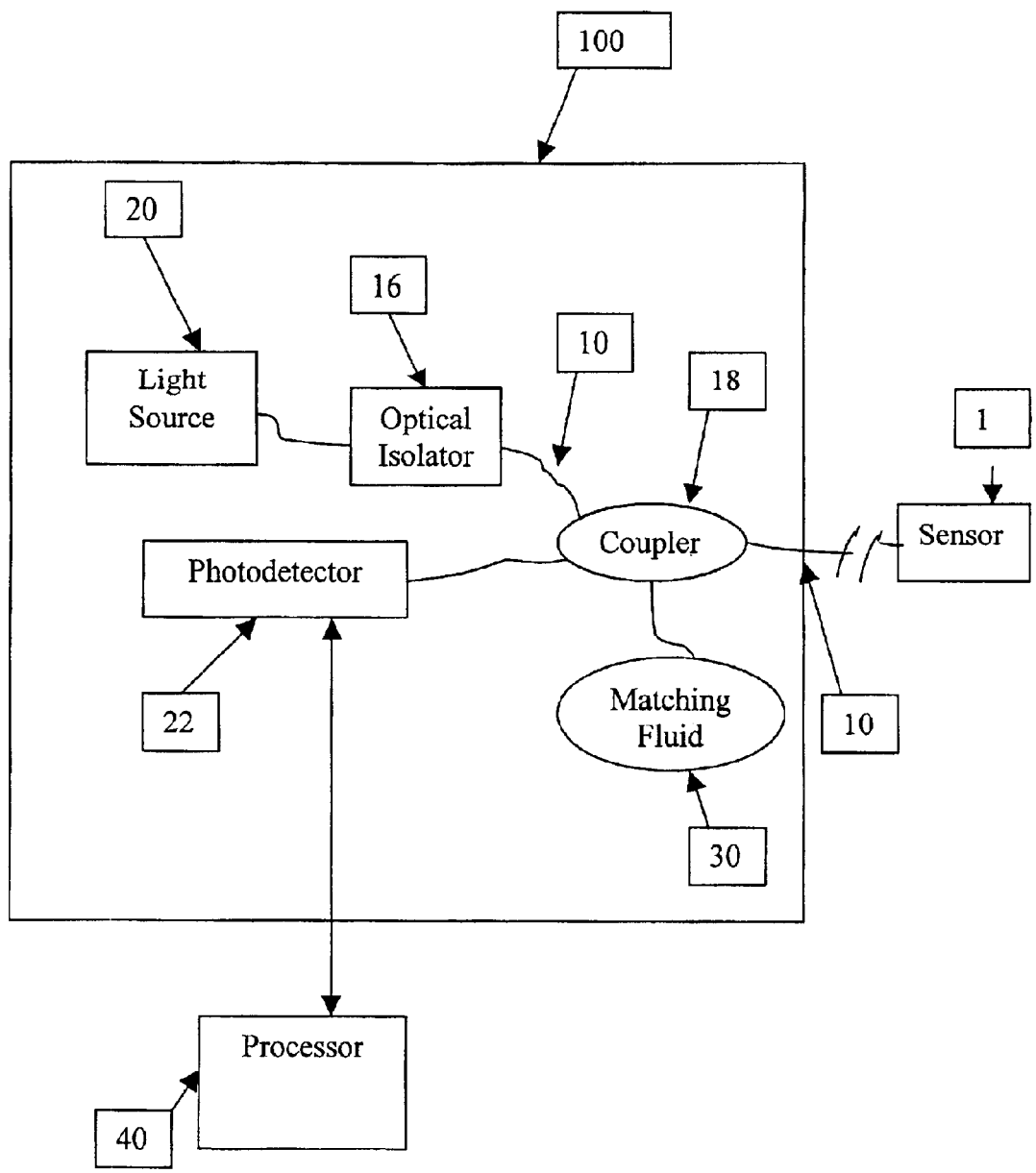
FIG. 6 is a schematic of the optical measurement scheme using the sensors of the present invention. The optical detection schemes for the sensors are based on the fact that the reflected light from the sensor is spectrally shifted.

FIG. 6 illustrates a fiber optic sensing system 100. The system 100 operates to measure a change in reflected light from the sensor diaphragm 12. In accordance with one embodiment of the present invention, the sensor system 100 includes a light source 20, and a photodetector 22. It will be understood that the system 100 may include other suitable devices and systems without departing from the scope of the present invention. An optical fiber 10 is used to couple the individual components of the sensor monitoring system and the sensor 1 and for the delivery of optical signals between the optical signal processing equipment 100 and the pressure sensing device 1, either directly or via interface equipment (not shown) as required.

The light source 20 is generally a laser that produces coherent light on a suitably narrow spectral line. For example, the light source 20 may be a semiconductor laser diode, a solid state laser such as a neodymium yttrium aluminum garnet (ND:YAG) laser, or any other suitable source of light. In a particular embodiment, the light source 20 is a continuously operating semiconductor laser diode.

In one embodiment, the optical signal processing equipment 100 includes a broadband source of light 11, such as a light emitting diode (LED), and appropriate light filtering equipment for delivery of signal light to the silicon 12 included within the pressure sensing device 1. Additionally, the optical signal processing equipment 100 includes appropriate optical signal analysis equipment 40 for analyzing the return signals from the sensor 1. For example, the signal analysis equipment 40 may include the necessary hardware and software to implement the optical signal diagnostic equipment disclosed in U.S. Pat. Nos. 4,996,419; 5,401,956; 5,426,297; and/or 5,493,390, The light source and detection unit provides an optical source signal, which may be a broadband or narrowband signal depending on the particular application. The light source 20 and detection unit 22 is known in the art; and the scope of the invention is not intended to be limited to any particular kind of optical source, or any particular broadband optical source signal.

The measurement unit 40 responds to the fiber optical signals, which is received by the detection unit 22, for providing a measurement unit signal containing information about the sensor. The measurement unit 40 is known in the art, and may include a typical microprocessor based architecture, including a microprocessor, RAMS and ROM memory, input/output devices, and a bus for providing data and control signals between these elements. The scope of the invention is not intended to be limited to any particular hardware and software design of the measurement unit 40. The scope of the invention is not intended to be limited to any particular optical signal processing technique.

An amplitude sensor for detection of temperature variations, mechanical tensions, pressure, acoustic fields and other physical fields that are able to vary either the refractive index or geometry of the sensor 1. Detection is generally of at least one of acoustical vibration, mechanical vibration, pressure, temperature, acceleration, electrostatic fields, and magnetic fields.

In one embodiment, as shown in FIG. 6, the light produced by the light source 20 is directed through the optical fiber 10 to the coupler 18. Optionally, the light is directed first to an optical isolator 16. The optical isolator 16 prevents destabilization of the light from the light source 20 due to optical feedback from the various components of the sensor monitoring system 100. Specifically, the optical isolator 16 blocks back-reflection that can cause phase noise, amplitude noise, and mode hopping of the light source 20. The light from the optical isolator 16 is directed through the optical fiber 10 to the coupler 18.

The coupler 18 operates to split the light from the optical isolator 16 into two equal-amplitude components. A first component of the light is directed through the optical fiber 10 to the impedance matching liquid system 30. A second component of the light is directed through the optical fiber 10 to the sensor. In one embodiment, the sensor 1 comprises a fiber Fabry-Perot interferometer diaphragm sensor 12. The fiber Fabry-Perot interferometer diaphragm sensor 12 reflects a portion of the second component of the light. The reflected light passes through the coupler 18 to the photodetector 22.

The photodetector 22 converts the reflected light into an electrical signal. In an embodiment in which the light source 20 is a semiconductor laser diode, the photodetector 22 may be an indium gallium arsenide photodiode. However, it will be understood that the photodetector 22 may comprise any suitable photo-sensitive detector having similar functional capabilities.

The electrical signal generated by the photodetector 20 may be directed to a device 40. The device 40 operates to receive and process the electrical signal from the photodetector 20. In one embodiment, the device 40 is a display such as an oscilloscope. In another embodiment, the device 40 is a digital signal processor that utilizes the electrical signal as part of a feedback control loop.

The optical fiber 10 in conjunction with the diaphragm 12 forms an internal cavity 14. In one embodiment, the cavity 14 is a closed cavity such that there is no communication between the cavity 14 and the outside environment. In this embodiment, the pressure fiber Fabry-Perot interferometer diaphragm sensor 12 can measure the absolute pressure as well as dynamic changes in pressure P. The closed cavity 14 may also be pressurized or evacuated to increase the measurement range or sensitivity of the fiber Fabry-Perot interferometer diaphragm sensor 12. A dampener may be disposed within the closed cavity 14. The dampener operates to dampen the diaphragm 12 during operation and may be particularly useful during high frequency operation of the pressure fiber Fabry-Perot interferometer diaphragm sensor 1. In one embodiment, the dampener is a fluid disposed within the closed cavity 14. In yet another embodiment, the cavity 14 is open to the environment. In this embodiment, the pressure fiber Fabry-Perot interferometer sensor 1 can readily detect dynamic changes in pressure P. The diaphragm 12 operates to move, or deflect, in response to the pressure P acting on the diaphragm 12. The pressure P is a differential pressure in that the pressure P is the difference between the pressure within the cavity 14 and the outside environment.

The deflection of the diaphragm 12 is directly related to the thickness of the diaphragm 12 and the material from which the diaphragm 12 is fabricated. For example, the greater the thickness of the diaphragm 12, the higher the pressure P that can be measured. Similarly, the harder the material forming the diaphragm 12, the greater the pressure P that can be measured.

The design characteristics of the pressure fiber Fabry-Perot interferometer diaphragm sensor allow the pressure fiber Fabry-Perot interferometer diaphragm sensor to be configured to measure both positive and negative pressures absolutely and dynamically.

Figure 7:
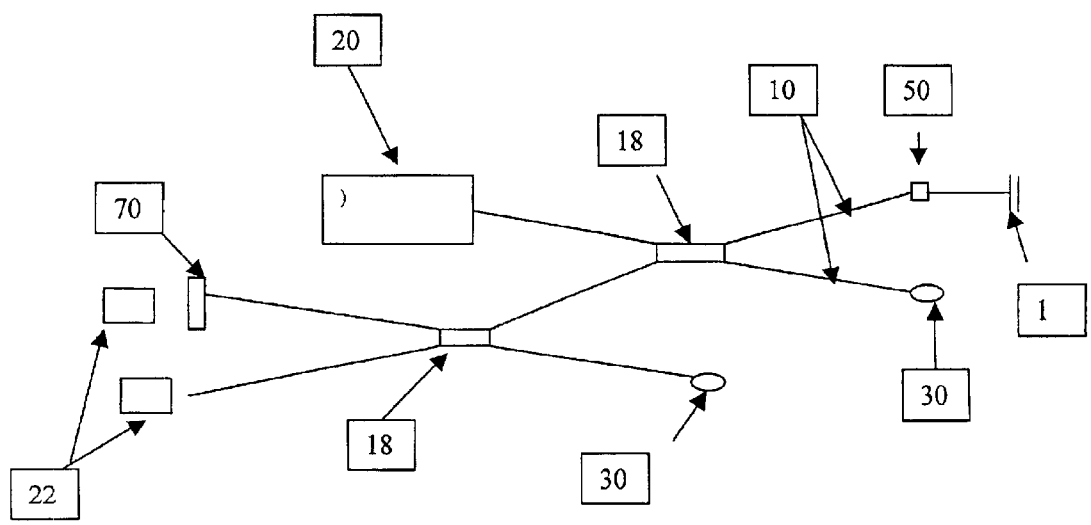
FIG. 7 is a schematic of an alternate optical measurement scheme using the sensors of the present invention.

In another embodiment, as shown in FIG. 7, the light produced by the light source 20 is directed through the optical fiber 10 to a 2×2 coupler 18.

The 2×2 coupler 18 operates to split the light from the light source 20 into two equal-amplitude components. A first component of the light is directed through the optical fiber 10 to the impedance matching liquid system 30. A second component of the light is directed through the optical fiber 10 to the sensor. Optionally, the optical fiber connects to the sensor through one or more optical fiber connectors 50.

In one embodiment, the sensor 1 comprises a fiber Fabry-Perot interferometer diaphragm sensor 12. The fiber Fabry-Perot interferometer diaphragm sensor 12 reflects a portion of the second component of the light. The reflected light passes through the coupler 18 to the photodetector 22. Optionally, the reflected light is directed first to a second optical coupler 18. The second optical coupler 18 operates to split the light from the first coupler 18 into two components. A first component of the light is directed through the optical fiber 10 to an impedance matching liquid system 30. A second component of the light is directed through the optical fiber 10 to one or more photodetectors 22.

The reflected light passes through the second optical coupler 18 to the photodetector 22. In one embodiement, the reflected light directed from the second coupler 18 first passes through a high pass optical filter 70 and then to a photodetector. In an alternate embodiment, the second coupler is a 2×2 coupler that directs light also to a second photodetector 22.

The photodetector 22 converts the reflected light into an electrical signal. In an embodiment in which the light source 20 is a semiconductor laser diode, the photodetector 22 may be an indium gallium arsenide photodiode. However, it will be understood that the photodetector 22 may comprise any suitable photo-sensitive detector having similar functional capabilities.

The electrical signal generated by the photodetector 20 may be directed to a device 40. The device 40 operates to receive and process the electrical signal from the photodetector 20. In one embodiment, the device 40 is a display such as an oscilloscope. In another embodiment, the device 40 is a digital signal processor that utilizes the electrical signal as part of a feedback control loop.

In one embodiment, the sensor system comprises, a light source 20 and a light detector 22, connected to a fiber trunk 10. The fiber trunk 10 is a continuous fiber, connected at one end to a light source 20 and a sensor 1 at to the other end. In this embodiment, a length of multimode fiber is connected with the sensor of the present invention. The multimode optical fiber is illuminated by a coherent light source. This results in the light following in different optical paths in the multimodal fiber. Each optical path is modulated differently by external disturbances, such as vibrations, temperature and/or pressure variations. The invention described herein is based on the variation in intensity of light detected by the detector collected on the face of the multimode fiber.

The light source 20 may be a convenient source of illumination, such as a laser diode or light emitting diode (LED), though other types of illumination may be considered, as those skilled in the art can recognize. The detector may be of a convenient type, such as a semiconductor photodetector with appropriate wavelength response characteristics.

The resulting sensor of the present invention will produce a signal that may be processed for intensity change and frequency content to determine the extent of static and dynamic stress or strain occurring in a structure or material in which the fiber sensor is embedded or bonded to. Appropriately configured, the sensor can also measure acceleration, or other physical field effects, e.g., magnetic fields.

Examples of suitable optical fiber substrate materials include glass, plastic, glass/glass composite and glass/plastic composite fiber waveguides. A critical characteristic of optical fibers is attenuation of the optical signal. Thus, glasses which contain unacceptable levels of transition-metal impurities when prepared from naturally occurring materials lead to high absorption losses. Silica fibers of acceptable quality can be prepared from purified starting materials (e.g., silicon tetrachloride and germanium tetrachloride) using conventional glass-melting techniques of drawing into fibers.

Generally, although not necessarily, the fiber will comprise a fiber core 116 provided with a cladding means 118. As will be appreciated by those skilled in the art, the cladding means 118 serves to provide structural support for an otherwise fragile fiber 116, and also provides a coating which guides light conducted along the fiber. In the present case, the cladding means typically comprises a fluoropolymer such as polymeric fluoroacrylate. However, the cladding means may also be comprised of glass, or it may be comprised of polystyrene, polyimide or any other suitable plastic material.

Also, the ends of the optical fibers may optionally be immersed in a refractive index matching fluid 30 to reduce the loss of optical power during the transmission of signals. The optical fibers may be conventional single mode fibers, polarization-preserving fibers, multi-mode fibers or cable, UV-NIR transmissive fiber cable, hard polymer clad fiber cable or single mode optical fibers having expanded cores at their endfaces. Micromechanical actuators are well known in the art and are described, for example, in U.S. Pat. Nos. 5,808,384 and 5,378,583, incorporated herein by reference in their entirety.

EXAMPLE 1
Pressure Sensor Configuration and Fabrication

The configuration of the Fabry-Perot interferometric optical fiber pressure sensor reported here is shown in FIG. 1(b). The silicon diaphragm 12 and the cavity-fiber interface act as reflectors forming a Fabry-Perot interferometer. Pressure causes the diaphragm 12 to move, thus changing the Fabry-Perot reflectivity, and allowing measurement of pressure. The optical fibers 10 used for the fabrication are generally borosilicate multimode glass fibers (Techman International Corporation Inc.; the index of refraction of borosilicate glass is 1.5098 at 850 nm).

Optic fibers are generally used with cladding diameters of from about 1 $\mu$m to about 5000 $\mu$m and are preferably from about 2 $\mu$m to about 500 $\mu$m. For example, the diameter of the core will determine whether the fiber optic is "single mode" or "multimode". The terms single mode and multimode refer to the dimensional orientation of rays propagating through the fiber. Single mode fibers have a core with a relatively small diameter (from about 2 to about 25 microns) and support only one mode of propagation, axial. Multimode fibers have a core with a relatively large diameter (from about 25 to about 500 microns) and permit non-axial rays or modes to propagate through the core. The so-called single mode fibers are actually two mode fibers in the sense that there are two different states of optical polarization that can be propagated through the core. In an ideal, straight, imperfection-free fiber with perfect circular symmetry, the propagation velocity of light is independent of the direction of polarization.

Optic fibers are preferably used with cladded diameters of from about 200 $\mu$m to about 400 $\mu$m and corresponding core diameters of from about 190 $\mu$m to about 360 $\mu$m, respectively. The micromachining process of the present invention is used on a flat fiber end face.

This generally includes photolithographic patterning, wet etching of a cavity, and bonding of a silicon diaphragm. Precise alignment is useful in order to improve efficiency of the sensor, and generally more precise alignment provides more efficient sensors. Using available technology, alignment to a tolerance of less than one micron can be achieved, and is desirable.

Examples of bonding methods include anodic bonding, epoxy bonding, metal bonding, glass-frit bonding, wafer direct bonding, and polyimide bonding. If epoxy bonding is utilized, then it may be useful to deposit a thin layer of epoxy, let it begin curing, and then bond the layers, which would reduce unwanted upwelling of epoxy into the fiber cavity. In one embodiment, anodic bonding is a useful technology for bonding the silicon layer to the glass layer.

In one embodiment borosilicate glass and silicon are stacked together and heated to about 180–500° C. while a voltage 160 of about 200–1000 volts is applied between the two plates for about 10 minutes.

A suitable adhesive can be applied to the end of an optical fiber 10 and/or into a fiber cavity 14. In one embodiment an index-matching epoxy such as EPOTECH 301, 302, or 353ND, available from Epoxy Technologies, Inc. of Billerica, Mass. is used in order to approximately match the index of the optical fiber and the second layer. In one embodiment, the epoxy is selected is substantially transparent at the intended wavelength.

Generally, an optical fiber is provided that has an end face formed therein. In some embodiments it may be useful to polish the end face; however in embodiments in which the index of refraction of the epoxy matches that of the fiber core, polishing is unnecessary.

In one embodiment, an index-matching epoxy such as Epotech 301, 302, or 353ND, available from Epoxy Technologies, Inc. of Billerica, Mass. is used in order to approximately match the index of the optical fiber and the second layer. The epoxy is selected to be substantially transparent at the intended wavelength.

Fabrication begins with a section of fiber 10. Preferably, though not required, both fiber ends were first cleaved and then polished using 0.31 $\mu$m grit size polishing paper for surface flatness. A thin layer of thinned photoresist 114 (e.g., Shipley 1818 positive photoresist at photoresist:thinner=2:1) is applied on one fiber end followed by soft baking for 30 minutes in an oven at 90° C. Photolithographic patterning utilizing two different exposing techniques (FIG. 2) forms the cavity 14 on the fiber end face. This is generally followed with wet etching of the fiber core area in a buffered hydrofluoric acid solution. The first technique involved coupling blue Argon laser light 110 ($\lambda$=457.9 nm) into the opposite fiber end from the one on which fabrication would take place using a low magnification microscope objective (5×) lens 120, while the second technique simply directs this converged blue light 112 onto the photoresist-coated fiber end face using a high magnification objective (50×) lens 120. The laser can be a collimated laser beam. The first technique exposes the photoresist 114 leaving a circular area of photoresist 114 whose diameter was equal to that of core 116 diameter of the fiber 10, while the second technique caused the photoresist 114 to develop leaving a circular area whose diameter was equal to the beam diameter. The cavity 14 may extend into the cladding 118 as long as the structural integrity of the fiber 10 is maintained. This latter technique was found to be less accurate in forming a calculated cavity diameter since the 50× objective 120 produces diffraction effects and spatial spreading of the beam at the perimeter of the laser beam (see FIG. 2) as one moves off-focus. The appropriate exposure power depends on the photoresist 114 thickness and can be determined in conjunction with exposure time for a given case. A typical exposure power is from about 10 $\mu$W to about 1000 $\mu$W, preferably from about 50 $\mu$W to about 400 $\mu$W, and most preferably about 100 $\mu$W to about 200 $\mu$W exposed for about 3 to about 800 seconds, preferably exposed for about 10 to about 180 seconds and most preferably exposed for about 30 to about 80 seconds. Focusing of the photoresist-coated fiber was done (prior to exposure to blue laser light), using red light through the same objective and with the use of video monitor.

Figure 4:
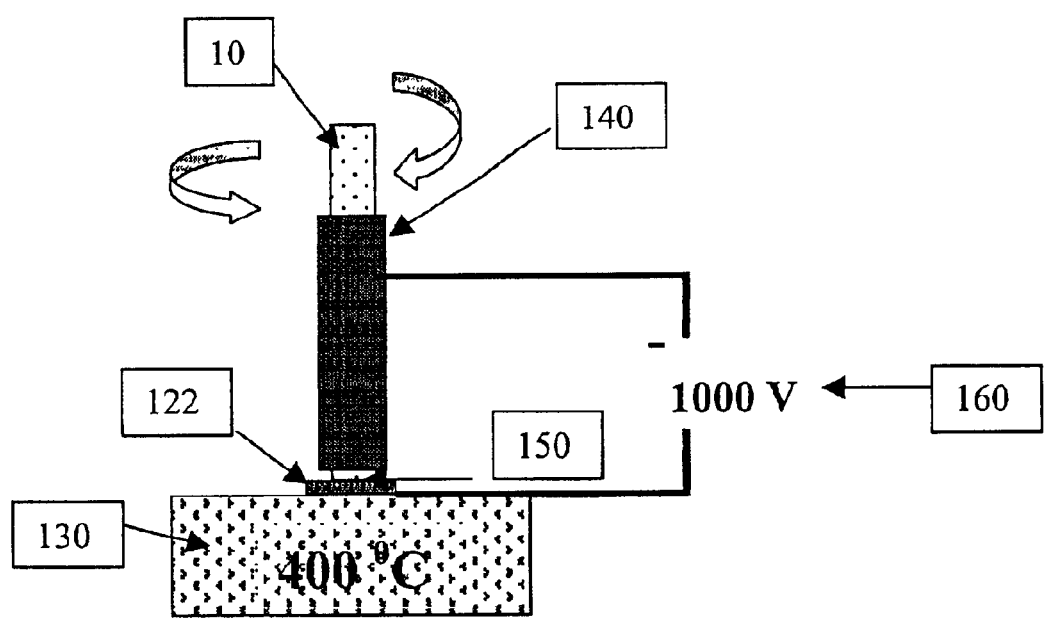
FIG. 4 is a schematic of the bonding of crystalline silicon onto fiber end face. This bonding is a key fabrication step in the fabrication of both pressure and temperature sensors. The bonding method is called anodic bonding and is usually used in bonding glass and silicon wafers. In the present invention, this is adopted to bond silicon to an optical fiber end face.

Anodic bonding [7], which is used commonly in MEMS for bonding glass and silicon wafers, may be used to bond a thin silicon diaphragm on to the fiber end. FIG. 4 is a schematic of the bonding of crystalline silicon 122 onto fiber end face. This bonding is a key fabrication step in the fabrication of both pressure and temperature sensors. The bonding method is called anodic bonding and is usually used in bonding glass and silicon wafers. In the present invention, this is adopted to bond silicon to an optical fiber end face.

This bonding mechanism works for bonding silicon to optical fibers since optical fibers 10 are made out of glass. Fibers 10 with a cavity 14 formed at the end face are base-cleaned and then coated with silver paint 140 (except at the end) in order to make an electrical connection. Pieces of ultra-thin silicon wafers 122 of known thickness (generally from about 0.1 $\mu$m to about 100 $\mu$m, preferably from about 0.5 $\mu$m to about 50 $\mu$m and most preferably from about 1 $\mu$m to about 10 $\mu$m are utilized. The fiber end face is positioned so that its entire area is in contact with silicon 122 that was in turn in contact with a hot plate 130. In order to cause anodic bonding, a voltage potential is place across the silicon wafer 122 to the silver coating 140. The silicon wafer is then heated at a temperature, with a sufficient voltage, for a time sufficient to cause anodic bonding. Generally, the plate 130 is heated to from about 200° C. to about 1000° C., preferably from about 300° C. to about 600° C., more preferably, from about 350° C. to about about 450° C. Application of a voltage of about 500 to about 2000V is applied between the silver coating 140 and the wafer 122. Preferably, the voltage is from about 800 V to about 1500 V, more preferably, from about 900 V to about 1200V between the fiber and silicon for about 0.1 to about 30 minutes, preferably from about 0.5 to about 10 minutes, more preferably from about 1 to about 5 minutes to result in very strong bonding.

Sensor Design and Results

As described above, changes of the amount of light reflected can be related to pressure. The key design parameters of diaphragm 12 thickness, initial cavity depth, and cavity diameter can be varied to provide linear response over various pressure ranges. The silicon diaphragm 12 was modeled as a circular membrane [8]. As an example, calculations indicated that at a wavelength of $\lambda_0$=850 nm, the diaphragm thickness required for making a diaphragm-center-deflection of $\lambda_0$/4 at 80 psi was 7 $\mu$m. This calculation was done for a cavity whose diameter was 135 $\mu$m, and a cavity depth of 0.640 $\mu$m.

The diaphragm 12 preferably has a planar surface and can be any solid material used in the formation of substrates for conventional optical devices. Desired characteristics of these materials include mechanical and optical stability at typical operating temperatures of the device, and it is preferably a wafer having an oxide layer of about 2 $\mu$m or less. Preferred materials for use in the fabrication of diaphragm include printed circuit board material, polymers, quartz, glass, semiconductor wafer, inorganic crystals and silicon. The most preferred substrate materials are silicon and quartz.

The optical detection scheme is based on the fact that the reflected light from the sensor is spectrally shifted (see Ref. 1). A light source, such as a broadband light emitting diode (LED) centered at 850 nm, is routed onto the sensor through a coupler. In one embodiment, the coupler may be a 2×2 coupler. The reflected light was collected back through the same fiber and was routed to a second 2×2 coupler that splits the reflected light into two equal intensity signals. One of the signals was routed to a photodetector and the other to a high band pass optical filter and photodiode combination. The ratio of the output of the two photodetectors was taken to be a measure for the sensed parameter.

Figure 3:
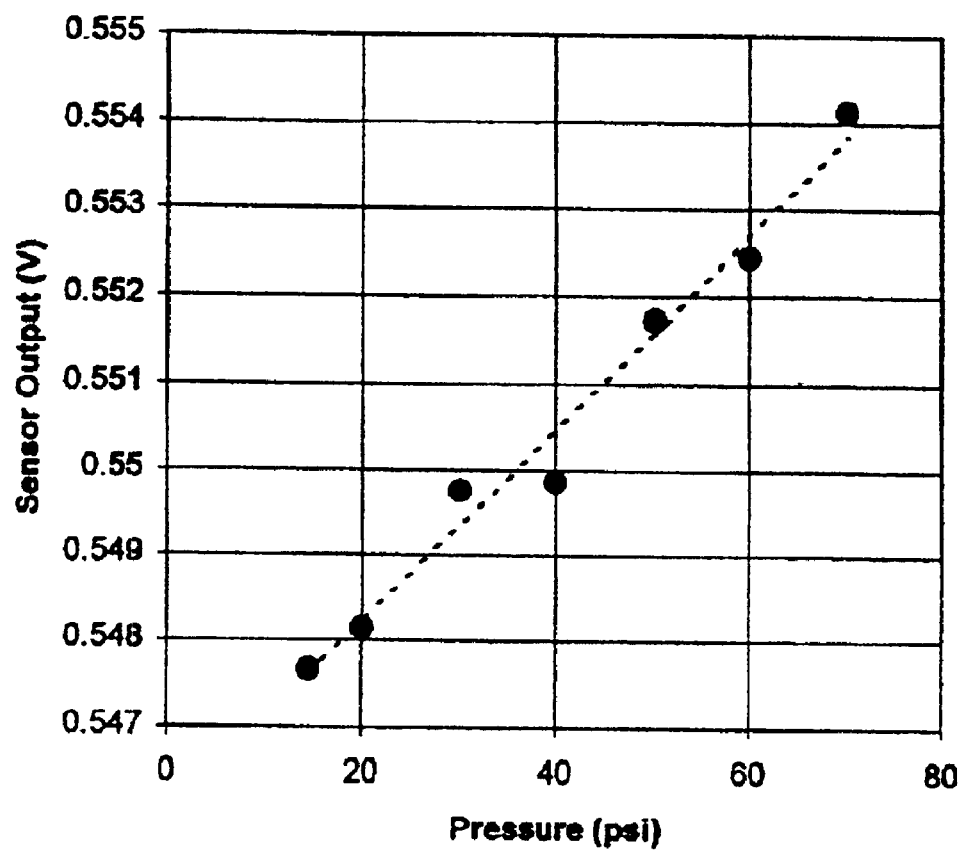
FIG. 3 is a plot of sensor output in volts versus pressure in psi. Each pressure point is an average of 100 readings. A broadband light emitting diode (LED) centered at 850 nm was used as the illumination source. The best fit to the data gives a sensitivity of about 0.11 mV/psi with ±0.01 mV/psi departure from linearity.

A pressure sensor fabricated on an optical fiber with the above design values was tested showing an approximately linear response to static pressure 0–80 psi. The slope of the best fit to the data gives a sensitivity of about 0.11 mV/psi with ±0.01 mV/psi departure from linearity. The static pressure response results are shown in FIG. 3. Each pressure point is the average of 100 readings acquired. The pressure was also monitored with a "Druck" pressure calibrator and the output was acquired with a computer based data acquisition system. The LED and photodiodes were maintained at a constant temperature with a thermoelectric cooler assembly that can be monitored during experiment to insure constant LED output.

While the present invention has been particularly shown and described with reference to preferred embodiments, it will be readily appreciated by those of ordinary skill in the art that various changes and modifications may be made without departing from the spirit and scope of the invention. It is intended that the claims be interpreted to cover the disclosed embodiments, those alternatives that have been discussed above and all equivalents thereto.

EXAMPLE 2

Temperature Sensor Configuration

The temperature sensor is achieved by anodically bonding ultra-thin crystalline silicon onto a fiber end face (the figure above). Thin-film based temperature sensors have been realized in a number of ways including sputter-deposited semiconductor [6] and dielectric [7] materials. For effective operation the thickness of the silicon film of these Fabry-Perot interferometer based sensors usually falls within the range of 0.8 $\mu$m to 4.3 $\mu$m [6]. Greater sensitivity is obtained at the high end of this range; however, film-nonuniformity, and stress have been found to impose an upper thickness limit of about 2 $\mu$m for sputter-deposited semiconductors. In this study we used the anodic bonding method to chemically bond ultra-thin crystalline silicon onto fiber end faces; this enables achieving a thicker crystalline silicon layer on the fiber end face. As a result, a higher sensitivity can be expected. Further, the use of crystalline silicon with proper encapsulation will improve the stability of the sensor. For the temperature sensor, materials such as silicon nitride, gallium arsenide, Germanium, and numerous other metal alloys can be used in place of the crystalline silicon, as known in the art.

Figure 5:
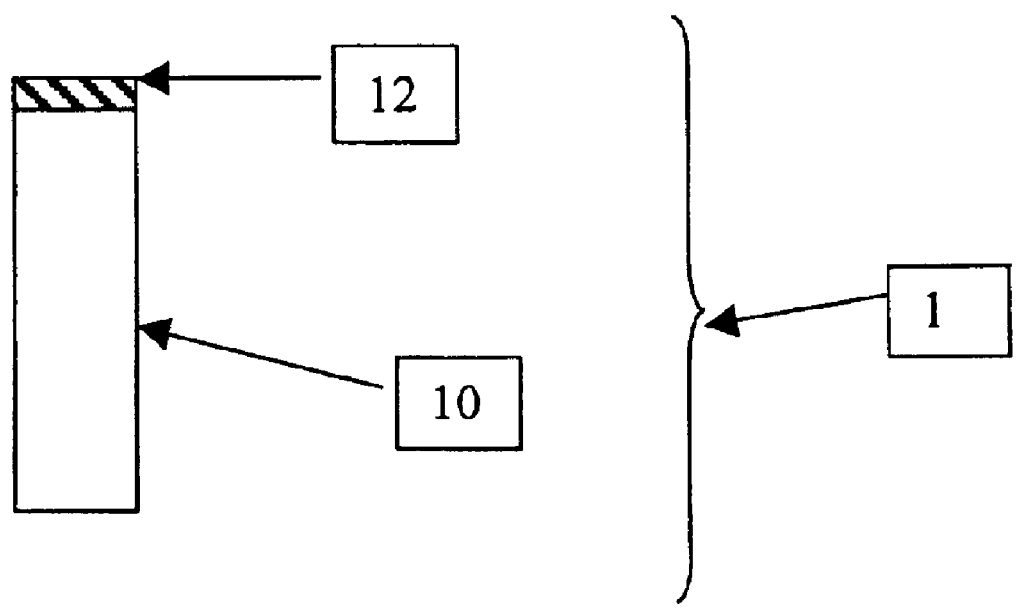
FIG. 5 is a schematic of the sensor in a configuration optimized for use as a temperature sensor. The temperature sensor is achieved by anodically bonding ultra-thin crystalline silicon onto a fiber end face.

The design principle of a thin-film temperature sensor is similar to that of the pressure sensor because both sensors are based on the Fabry-Perot interferometer. As seen in FIG. 5, the thin crystalline silicon wafer 12 is bonded directly to the optical fiber 10 to form the sensor 1. In this case the silicon is generally in a thickness approximately equal to from about 0.1 $\mu$m to about 100 $\mu$m, preferably from about 0.5 $\mu$m to about 50 $\mu$m, more preferably, from about 1 $\mu$m to about 10 $\mu$m.

The fabrication of temperature sensors required only bonding a piece of ultra-thin silicon 12 onto a fiber end face. In this case, the fibers with cladded diameters of 200 and 400 $\mu$m were used; the thickness of silicon in this Example was 3.1 $\mu$m.

The thin-film temperature sensors were tested by spectral reflectometry. LED light source ($\lambda$=850 nm) with 80 nm FWHM is launched into the optical fiber via a 2:1 fiber-optic coupler at the end opposite the temperature sensor head. The temperature of the air in the chamber was controlled to within ±0.5° C., as measured by a thermocouple. The fiber-optic coupler directs the two backward-propagating light beams to a spectrometer that is integrated with a charge-coupled-device (CCD) photodetector array. Because of interference between the two backward-propagating beams, the CCD output shows characteristic interference fringes; that is, a reflected-intensity versus wavelength spectrum. The thermo-optic coefficient of silicon, $\kappa_n = n^{-1} dn/dT$, ($74 \times 10^{-6}/°C$ at $\lambda$=850 nm) lead to a spectral shift in the spectrum. The amount of shift in spectrum was measured at different temperature in the temperature range 25–300° C.

Optical Measurement Scheme

The optical detection schemes for the pressure and temperature sensors are based on the fact that the reflected light from the sensor is spectrally shifted.

A measurement scheme, operated with a broadband light emitting diode (LED) centered at 850 nm, was used in characterizing pressure sensors and is explained in detail in Ref. [2]. The LED was routed onto the sensor through a 2×2 coupler. The reflected light was collected back through the same fiber and was routed to a second 2×2 coupler that splits the reflected light into two equal intensity signals. One of the signals was routed to a photodetector and the other to a high-passband optical filter and photodetector combination. The ratio of the output of the two photodetectors was taken to be a measure for the sensed parameter.

REFERENCES

[1] Jie Zhou, Samhita Dasgupta, Hiroshi Kobayashi, J. Mitch Wolff, Howard E. Jackson, and Joseph T. Boyd, "Optically Interrogated MEMS Pressure Sensors for Propulsion Applications", Optical Engineering (accepted for publication).

[2] Youngmin Kim and Dean P. Neikirk, "Micromachined Fabry-Perot Cavity Pressure Transducer", IEEE Photonics Technology Letters, Vol. 12, pp. 1471–1473, 1995.

[3] Robert A. Pinnock, "Optical pressure and Temperature Sensors for Aerospace Applications", Sensor Review, Vol. 18, Issue: 1, pp. 32–38, 1998.

[4] D. Angelidis and P. Parsons, "Optical Micromachined Pressure Sensor for Aerospace Applications", Optical Engineering, Vol. 31, pp. 1638–1641, 1992.

[5] Michael H. Beggans, Dentcho I. Ivanov, Steven G. Fu, T. G. Jr. Digges, K. R. Farmer, "Optical Pressure Sensor Head Fabrication using Ultra-Thin Silicon Wafer Anodic Bonding", Proceedings of SPIE—The International Society for Optical Engineering. Vol. 3680, n II, pp. 773–782, 1999.

[6] Alexis Mendez, Ted F. Morse, Keith A. Ramsey, "Micromachined Fabry-Perot Interferometer with Corrugated Silicon Diaphragm for Fiber Optic Sensing Applications", Proceedings of SPIE-The International Society for Optical Engineering, Vol 1793, pp 170–182, 1993.

[7] Y. Kanda, K. Matsuda, C. Murayama, and J. Sugaya, "The Mechanism of Field Assisted Silicon-Glass Bonding", Sensors & Actuators, Vol. A21, pp. 939–943, 1990.

[8] Mario Di Giovanni, *Flat and Corrugated Diaphragm Design Handbook* (Mercel Dekker, NewYork), 1992.

What is claimed is:

1. A sensor comprising a sensing element and an optical fiber having a first and second planar end face, the sensing element comprising an ultra-thin semiconductor wafer of known thickness from about 0.1 $\mu$m to about 100 $\mu$m, wherein the wafer comprises material selected from the group consisting of semiconductor material, quartz, a polymer, inorganic crystal, and one or more metals, wherein the sensing element is bonded directly onto the first planar end face of the optical fiber, the sensing element being responsive to at least one of acoustical vibration, mechanical vibration, pressure, temperature, acceleration, an electrostatic field, a magnetic field, or combinations thereof.

2. A sensor as claimed in claim 1, wherein the sensing element is bonded onto the central portion of the first planar end face anodically, with epoxy, by metal bonding, by glass-frit bonding, by wafer direct bonding, or by polymide bonding.

3. A sensor as claimed in claim 1, wherein a light source is in optical communication with the second planar end face of the optical fiber.

4. A sensor as claimed in claim 1, wherein the sensing element is an ultra-thin semiconductor wafer of known thickness from about 0.5 $\mu$m to about 50 $\mu$m.

5. A sensor as claimed in claim 1, wherein the sensing element is an ultra-thin semiconductor wafer of known thickness from about 1 $\mu$m to about 10 $\mu$m.

6. A sensor as claimed in claim 3 wherein the light source is a coherent light source.

7. A sensor as claimed in claim 6 wherein light provided by the light source has a wavelength from about 200 nm to about 2200 nm.

8. A sensor as claimed in claim 7, the light source comprising a semiconductor laser diode, a solid state laser, or a light emitting diode.

9. A sensor as claimed in claim 1 wherein the optical fiber comprises a single mode fiber in optical communication with a light source.

10. A sensor as claimed in claim 1 wherein the optical fiber comprises a multi-mode fiber in optical communication with a light source.

11. A pressure sensing system comprising: a sensing unit comprising a diaphragm and an optical fiber having a first and second planar end face, the diaphragm comprising material selected from the group consisting of semiconductor material, quartz, a polymer, inorganic crystal, and one or more metals, wherein the diaphragm is bonded directly onto the first planar end face of the optical fiber, the diaphragm being positioned over a cavity formed in the central portion of the first planar end face, and wherein the diaphragm is responsive to pressure, the sensing unit being configured to transmit a transduced optical signal in response to pressure; an optical source for providing an optical source signal to the sensing unit; and a measurement unit, responsive to the transduced optical signal, for providing a measurement unit signal containing information about the pressure.

12. The pressure sensing system of claim 11, the diaphragm being anodically bonded directly over the cavity, the cavity being etched into the central portion of the first planar end face.

13. The pressure sensing system of claim 12, wherein the sensing system is a coupler-based interferometer sensing system.

14. The pressure sensing system of claim 11, wherein the sensing system further comprises a coulper for providing a coupled optical signal comprising a reference optical signal having a reference phase and the transduced optical signal; and wherein the measurement unit processes the coupled optical signal for providing the measurement unit signal containing information about the pressure.

15. A temperature sensing system comprising: a sensing unit comprising a sensing element and an optical fiber having a first and second planar end face, the sensing element comprising an ultra-thin crystalline semiconductor structure, wherein the ultra-thin crystalline semiconductor structure comprises material selected from the group consisting of semiconductor material, quartz, a polymer, and inorganic crystal, wherein the sensing element is anodically bonded directly onto the first planar end face of the optical fiber and wherein the sensing element is responsive to temperature, the sensing unit being configured to transmit a transduced optical signal in response to temperature; an optical source for providing an optical source signal to the sensing unit; and a measurement unit, responsive to the transduced optical signal, for providing a measurement unit signal containing information about the temperature.

16. A sensor as claimed in claim 1, wherein the semiconductor material is selected from the group consisting of silicon, silicon carbide, gallium arsenide, silicon nitride, germanium, or combinations thereof.

17. A sensing system comprising an array of sensors as claimed in claim 1.

18. The temperature sensing system of claim 15, wherein the sensing system is a coupler-based interferometer sensing system.

19. The temperature sensing system of claim 15, wherein the sensing system further comprises a coupler for providing a coupled optical signal comprising a reference optical signal having a reference phase and the transduced optical signal; and wherein the measurement unit processes the coupled optical signal for providing the measurement unit signal containing information about the temperature.

20. A sensor comprising a sensing element and an optical fiber having a first and second planar end face, the sensing element comprising a diaphragm, wherein the diaphragm is anodically bonded over a cavity etched into the central portion of the first planar end face wherein the diaphragm comprises material selected from the group consisting of semiconductor material, quartz, a polymer, inorganic crystal, and one or more metals, wherein the sensing element is bonded directly onto the first planar end face of the optical fiber, the sensing element being responsive to at least one of acoustical vibration, mechanical vibration, pressure, temperature, acceleration, an electrostatic field, a magnetic field, or combinations thereof.

21. A sensor as claimed in claim 20, wherein the sensing element is bonded onto the central portion of the first planar end face anodically, with epoxy, by metal bonding, by glass-frit bonding, by wafer direct bonding, or by polymide bonding.

22. A sensor as claimed in claim 20, wherein the cavity has a diameter from about 0.050 $\mu$m to about 2 $\mu$m.

23. A sensor as claimed in claim 20, wherein the cavity has a diameter from about 0.100 $\mu$m to about 1 $\mu$m.

24. A sensor as claimed in claim 20, wherein the cavity has a diameter from about wherein the cavity has a diameter from about 0.200 $\mu$m to about 1 $\mu$m.

25. A sensor as claimed in claim 20, wherein the sensor is formed by photolithographic patterning of the first planar end face, wet etching of the cavity, and anodic bonding of the diaphragm to the first planar end face, the diaphragm being positioned over the cavity.

26. A sensor as claimed in claim 20, wherein a light source is in optical communication with the second planar end face of the optical fiber.

27. A sensor as claimed in claim 26, wherein the light source is a coherent light source.

28. A sensor as claimed in claim 27, wherein light provided by the light source has a wavelength from about 200 nm to about 2200 nm.

29. A sensor as claimed in claim 28, the light source comprising a semiconductor laser diode, a solid state laser, or a light emitting diode.

30. A sensor as claimed in claim 20, wherein the optical fiber comprises a multi-mode fiber in optical communication with a light source.

31. The sensor of claim 1, wherein the sensing element has a diameter substantially equal to the diameter of the optical fiber.

32. The pressure sensing system of claim 11, wherein the diaphragm has a diameter substantially equal to the diameter of the optical fiber.

33. The temperature sensing system of claim 15, wherein the sensing system of the sensing element has a diameter substantially equal to the diameter of the optical fiber.

34. The sensor of claim 20, wherein the sensing element has a diameter substantially equal to the diameter of the optical fiber.

* * * * *